US011675986B2

(12) United States Patent
Canini et al.

(10) Patent No.: US 11,675,986 B2
(45) Date of Patent: Jun. 13, 2023

(54) VIRTUAL-FRAME PREPROCESSING FOR OPTICAL SCANNING

(71) Applicant: Datalogic IP Tech, S.r.l., Bologna (IT)

(72) Inventors: Federico Canini, Bologna (IT); Davide Bruni, Bologna (IT); Luca Perugini, Bologna (IT)

(73) Assignee: Datalogic IP Tech, S.r.l., Bologna (IT)

( * ) Notice: Subject to any disclaimer, the term of this patent is extended or adjusted under 35 U.S.C. 154(b) by 0 days.

(21) Appl. No.: 17/575,065

(22) Filed: Jan. 13, 2022

(65) Prior Publication Data

US 2022/0139060 A1    May 5, 2022

Related U.S. Application Data

(63) Continuation of application No. 16/794,012, filed on Feb. 18, 2020, now Pat. No. 11,227,173.

(51) Int. Cl.
*G06K 9/20* (2006.01)
*G06K 7/10* (2006.01)

(52) U.S. Cl.
CPC ...... *G06K 7/10752* (2013.01); *G06V 2201/07* (2022.01)

(58) Field of Classification Search
None
See application file for complete search history.

(56) References Cited

U.S. PATENT DOCUMENTS 5,837,987 A    11/1998    Danielson et al.
8,201,740 B2    6/2012    Vinogradov et al.
8,899,484 B2    12/2014    Trajkovic et al.
9,185,306 B1    11/2015    Tan et al.
9,646,188 B1    5/2017    Kuchenbrod et al.
9,800,749 B1    10/2017    Tan et al.
10,244,180 B2    3/2019    Tan et al.
10,268,854 B1    4/2019    Tan et al.
(Continued)

FOREIGN PATENT DOCUMENTS

JP    H09211127    8/1997

OTHER PUBLICATIONS

Corrected Written Opinion, dated Jul. 29, 2021, for European Application No. 21157631.9, 2 pages.
(Continued)

*Primary Examiner* — Idowu O Osifade
(74) *Attorney, Agent, or Firm* — Cozen O'Connor

(57) ABSTRACT

An optical scanner captures a plurality of images from a plurality of image-capture devices. In response to the activation signal, an evaluation phase is executed, and in response to the evaluation phase, an acquisition phase is executed. In the evaluation phase, a first set of images is captured and processed to produce a virtual frame comprising a plurality of regions, with each region containing a reduced-data image frame that is based on a corresponding one of the plurality of images. Also in the evaluation phase, attributes of each of the plurality regions of the virtual frame are assessed according to first predefined criteria, and operational parameters for the acquisition phase are set based on a result of the assessment. In the acquisition phase, a second set of at least one image is captured via at least one of the plurality of image-capture devices according to the set of operational parameters.

20 Claims, 10 Drawing Sheets

(56) References Cited

U.S. PATENT DOCUMENTS

| | | | |
|---|---|---|---|
| 10,489,623 B1 | 11/2019 | Handshaw et al. | |
| 10,803,272 B1* | 10/2020 | Deshmukh | G06T 7/73 |
| 2002/0043561 A1* | 4/2002 | Tsikos | G06K 7/10594 |
| | | | 235/454 |
| 2007/0003105 A1 | 1/2007 | Nakamura et al. | |
| 2009/0084851 A1 | 4/2009 | Vinogradov et al. | |
| 2011/0157373 A1 | 6/2011 | Ye et al. | |
| 2017/0280028 A1 | 9/2017 | Tan et al. | |
| 2017/0289451 A1 | 10/2017 | Wittenberg et al. | |
| 2017/0343345 A1 | 11/2017 | Wittenberg et al. | |
| 2018/0024974 A1* | 1/2018 | Welinder | G06K 9/78 |
| | | | 715/229 |
| 2018/0124299 A1 | 5/2018 | Brook | |
| 2019/0087618 A1 | 3/2019 | Lei et al. | |
| 2019/0182413 A1 | 6/2019 | Tan et al. | |

OTHER PUBLICATIONS

DS36X8 Digital Scanner Product Reference Guide, MN-002689-13-EN, Revision A, 618 Pages, Sep. 2021.
Extended European Search Report issued in European Application No. 21212343.4, dated Apr. 19, 2022, 6 pages.
Extended European Search Report, dated Jul. 9, 2021, for European Application No. 21157631.9, 5 pages.
MC9300 Handheld Mobile Computer, Product Spec Sheet, ZIH Corp, (c) 2019.

* cited by examiner

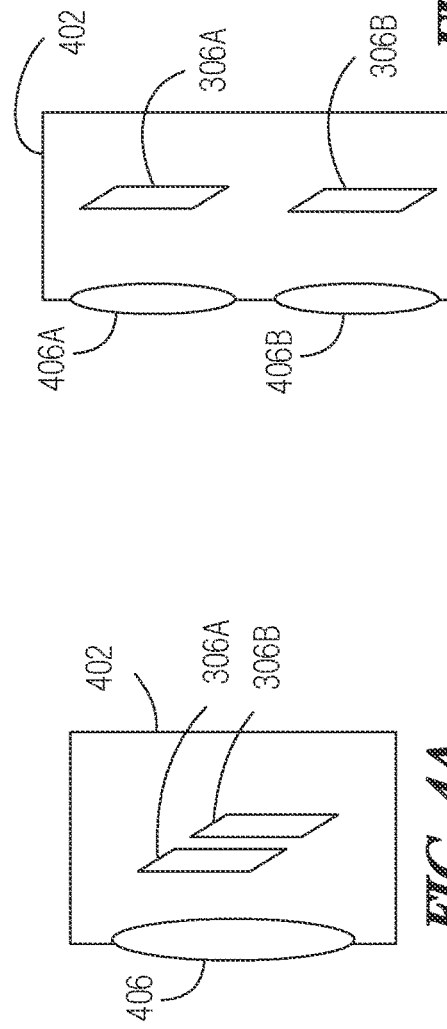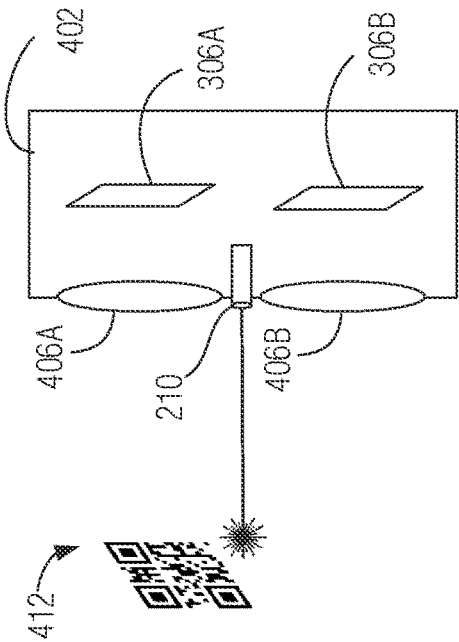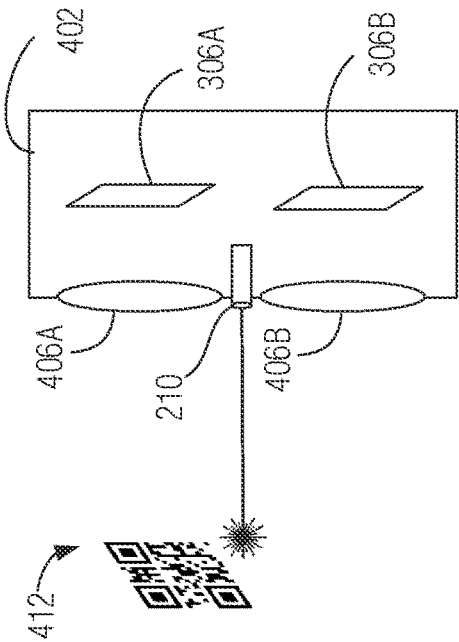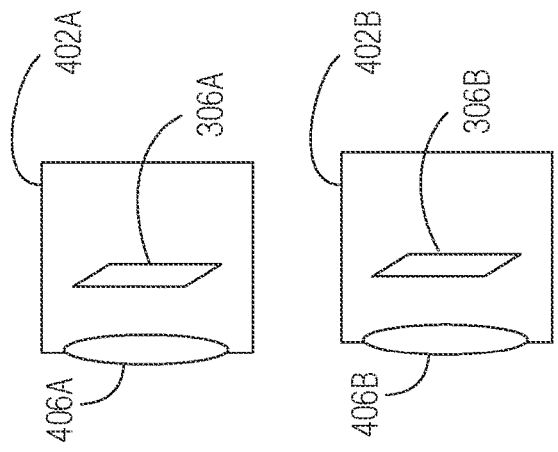

VIRTUAL-FRAME PREPROCESSING FOR OPTICAL SCANNING

PRIOR APPLICATION

This application is a continuation of U.S. patent application Ser. No. 16/794,012 filed Feb. 18, 2020, which is incorporated by reference herein.

TECHNICAL FIELD

The present disclosure generally relates to machine vision and, more particularly, to capturing and processing of images containing subject matter of interest such as machine-readable symbols or patterns.

BACKGROUND

Image-based optical scanning includes a diverse range of applications such as reading of machine-readable symbols (e.g., one-dimensional symbols, 2-dimensional symbols), optical character recognition, object detection or recognition, and the like. In general, such systems work by capturing a digital image of a subject using a camera with an image sensor, and computationally processing the captured image to autonomously detect, recognize, or read the subject. The output generally includes data represented by, or describing, the subject. For example, in the case of reading a 1-D or 2-D symbol, the output may be a number or an alphanumeric string represented by that symbol. Likewise, in the case of recognizing a printed or hand-written character or set of characters, the output may be a textual representation of that character or set; and in the case of object recognition, the output may be a classification result (e.g., a label) describing the object.

In situations where the capture of the image is complicated by one or more conditions or circumstances, such as varying distance between the camera and the subject, low light, reflections, backlighting, unsteady positioning of the camera, or the like, the quality of the captured image may be insufficient for the subsequent processing of the image to be effective. Optical scanners have been proposed that use multiple cameras to capture multiple images of the subject from multiple fields of view. In the case of specular reflections interfering with a first image of the subject as captured by one of the cameras, the second image captured by the second camera may be more readable. In situations where one part of the subject is unreadable in the first image, and another part of the subject is unreadable in the second image, an image processing technique has been proposed that combines the two images to produce a combined, readable, image of the subject.

Although image-processing techniques such as these offer certain advantages in reading the image-captured subject, the processing of multiple separate images adds computational burden. In practice, the added computational burden tends to slow down the responsiveness of the image-based optical scanner. As a result of this latency, the user-perceived performance of the scanner is degraded. Although greater computational resources may be provided in the scanner device, such as a faster processor, more memory, etc., bolstering the computational resources has its own downsides, such as increasing the cost of the device and requiring more power, thus reducing the uptime of battery-powered scanner devices. A solution is needed to improve image-based optical scanning devices to address these, and other, challenges.

SUMMARY

According to some aspects of this disclosure, an apparatus of an optical scanner for scanning a subject is provided. In the apparatus, an interface circuit includes an input to receive a plurality of images from a plurality of image-capture devices, such as different cameras, each with an image sensor, for instance. An input is provided to receive an activation signal. The apparatus further includes circuitry coupled to the interface circuit and the input. The circuitry is operative to execute an evaluation phase in response to the activation signal, and an acquisition phase in response to the evaluation phase.

In the evaluation phase, a first set of images is captured via a plurality of image-capture devices and processed to produce a virtual frame comprising a plurality of regions. Each region contains a reduced-data image frame that is based on a corresponding one of the plurality of images. Also, in the evaluation phase, attributes of each of the plurality regions of the virtual frame are assessed according to first predefined criteria, and operational parameters for the acquisition phase are set based on a result of the assessment. In the acquisition phase, a second set of at least one image is captured via at least one of the image-capture devices according to the set of operational parameters.

In a related aspect, method for operating an optical scanner includes capturing a plurality of images from a plurality of image-capture devices in response to an activation signal. According to the method, an evaluation phase is executed in response to the activation signal, and an acquisition phase is executed in response to the evaluation phase. In the evaluation phase, a first set of images is captured via a plurality of image-capture devices and processed to produce a virtual frame comprising a plurality of regions, with each region containing a reduced-data image frame that is based on a corresponding one of the plurality of images. Also, in the evaluation phase, attributes of each of the plurality regions of the virtual frame are assessed according to first predefined criteria, and operational parameters for the acquisition phase are set based on a result of the assessment. In the acquisition phase, a second set of at least one image is captured via at least one of the image-capture devices according to the set of operational parameters.

BRIEF DESCRIPTION OF THE DRAWINGS

FIGS. 4A-4D are simplified schematic diagrams that illustrate various optical and image-sensor combinations that may be employed as examples of one or more image-capture devices according to various embodiments.

DETAILED DESCRIPTION

Figure 1:
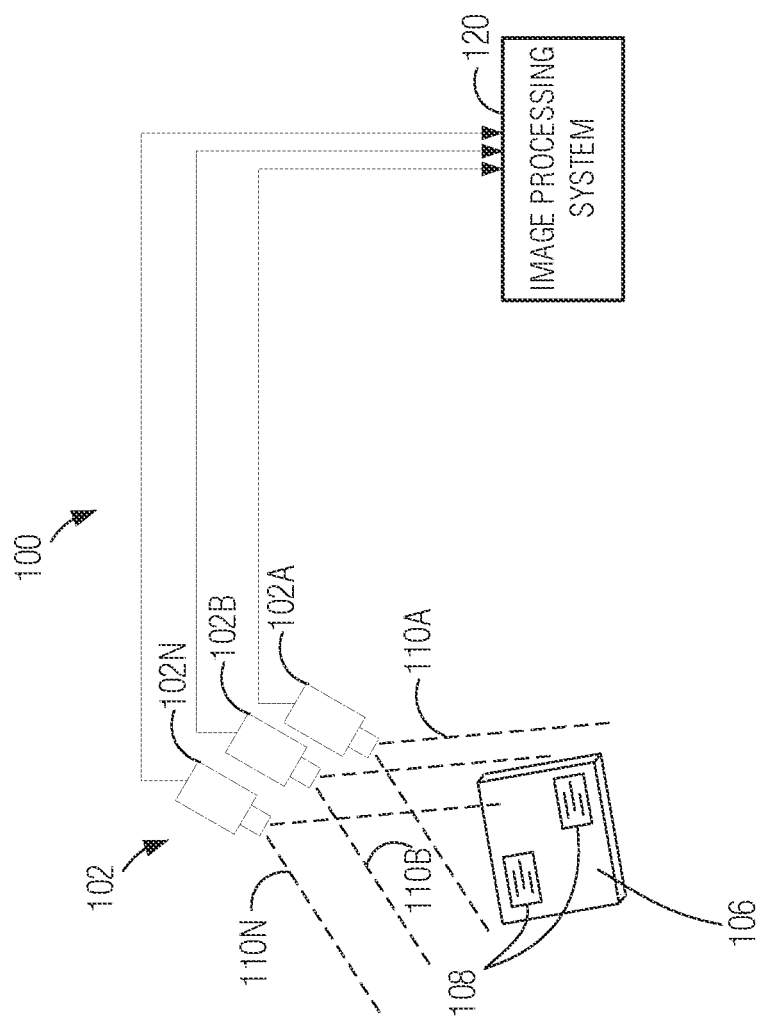
FIG. 1 is a simplified block diagram illustrating an implementation of a scanning system according to at least one example embodiment.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operatively connected with each other, such as connected through a direct connection or through an indirect connection (e.g., via another structure or component).

Some aspects of the present disclosure provide an image-based optical scanning system having multiple image-capture devices. FIG. 1 is a simplified block diagram illustrating an implementation of a scanning system 100, according to at least one example. As discussed further below, the scanning system 100 may be employed to capture multiple images of a subject, such as a machine-readable symbol or set of symbols 108 (e.g., text), or a machine-detectable or -recognizable object 106. Scanning system 100 may read, recognize, detect, or perform other automated analytical processing of the subject. For the sake of brevity, operations such as these will be referred to in the present context as "reading."

Scanning system 100 includes multiple image-capture devices, 102A, 102B, and 102N (collectively, image-capture devices 102). Each image-capture device 102 may include an image sensor that is constructed and operative to produce signals representing images or video frames. In the present context, the terms "image" and "video frame" may be used interchangeably to refer to a fixed image or portion thereof, with any distinctions intended between the two data types specifically called out if pertinent.

Each image-capture device may be assembled together with optical components, such as an objective, microlens array, or the like. In other examples, more than one individual image-capture device may share a common optical system. Image-capture devices 102A-102N may be constructed using any suitable technology, whether known or arising in the future. Without limitation, some examples include complementary metal-oxide semiconductor (CMOS)-based sensors, charge-coupled device (CCD)-based sensors, sensors optimized for the visible spectrum, sensors optimized for infrared or near-infrared frequencies, high-dynamic-range (HDR) sensors, monochrome sensors, color sensors, or the like. In related implementations, the set of image-capture devices 102 that are employed in scanning system 100 include sensors of diverse types, such as a grouping that includes conventional image sensor and a HDR image sensor, for example.

As shown in the example of FIG. 1, image-capture devices 102A, 102B, and 102N have respective fields of view 110A, 110B, and 110N. In related examples, the various image-capture devices 102 have different focal lengths or other optical characteristics.

Image-capture devices 102 are communicatively coupled to image processing system 120, which is configured to receive the captured images and perform the processing operations for reading of the subject. In some embodiments, as described in detail below, image processing system 120 employs a multi-phase operational regime to quickly and efficiently determine one or more operational parameters for capturing the images taking into account the prevailing conditions surrounding the subject, the environment, and usage of scanning system 100. According to some examples, the operational parameters that may be determined include:

selection of one of the image sensor/camera which is deemed optimal;
exposure setting for the image capture;
gain control for the image sensor;
focus configuration; or
illumination settings.

In some embodiments, each image-capture device 102 may be communicatively coupled to an image processing system 120 through a wired or wireless medium. In a related embodiment, a network (e.g., LAN, WAN, PAN, Internet) may facilitate the communicative coupling. In some embodiments, the image-capture device 102 may be connected directly to the image processing system 120 through a suitable local interface (e.g., I$^2$C, USB) or may be integrated with the image processor system and interconnected using an internal interconnect such as a suitable variant of a peripheral component interconnect (PCI), serial AT Attachment (SATA), mobile industry processor interface (MIN), or other interconnects known by those skilled in the art.

Figure 2:
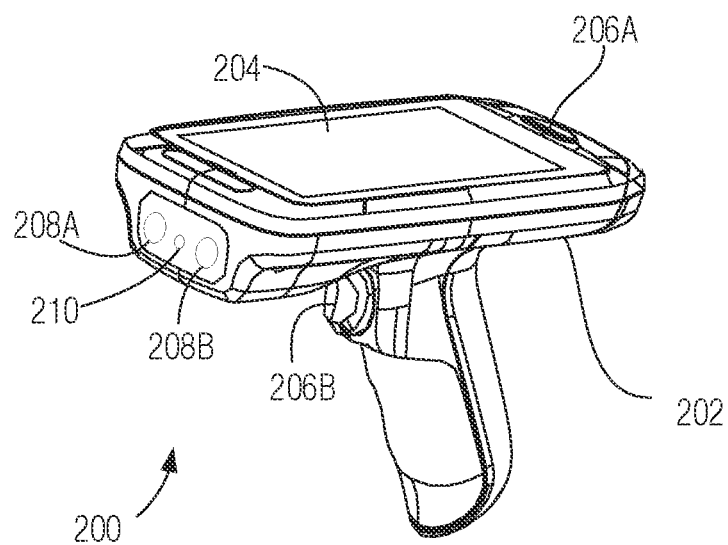
FIG. 2 is a diagram illustrating handheld reader as one example implementation of a scanning system.

FIG. 2 is a diagram illustrating handheld reader 200 as one example implementation of scanning system 100. Handheld reader 200 includes housing 202, display 204, and pushbutton controls 206A and 206B. As depicted, handheld reader 200 also includes forward-facing cameras 208A and 208B positioned in a spaced-apart relationship so as to have partially overlapping fields of view. In some examples, a forward-facing laser emitter 210 is provided to facilitate ranging to the subject. Laser emitter 210 may work in concert with one or both of the cameras 208A, 208B according to a triangulation technique in which a position of the laser spot within the field of view of one or both of the cameras is indicative of the distance to the subject.

In other examples, a laser emitter (not shown) may work with a detector (not shown) to provide time of flight (TOF) distance measurements. The ranging measurements may be used as input (among other inputs) to determine operational parameters such as selection of image sensor for subsequent information processing, focus setting, illumination power, sensor gain, exposure control, frame rate, and other settings.

In related embodiments, handheld reader 200 includes other types of sensors, such as an accelerometer (not shown) that can measure the motion of handheld reader 200. Motion data may be indicative of the user's scanning technique, such as the user's steadiness (or lack thereof) of holding handheld reader 200. The motion data may likewise be used as an input (among other inputs) to determine the operational parameters.

According to other embodiments, a reader may be mounted to a stationary or mobile structure. Examples of mounting locations for various scanning applications include vehicles, doorways, ramps, conveyors, buildings, robots, or the like. In mounted implementations, the cameras may have their own respective housings, which may be separate from the image processing system hardware.

Figure 3:
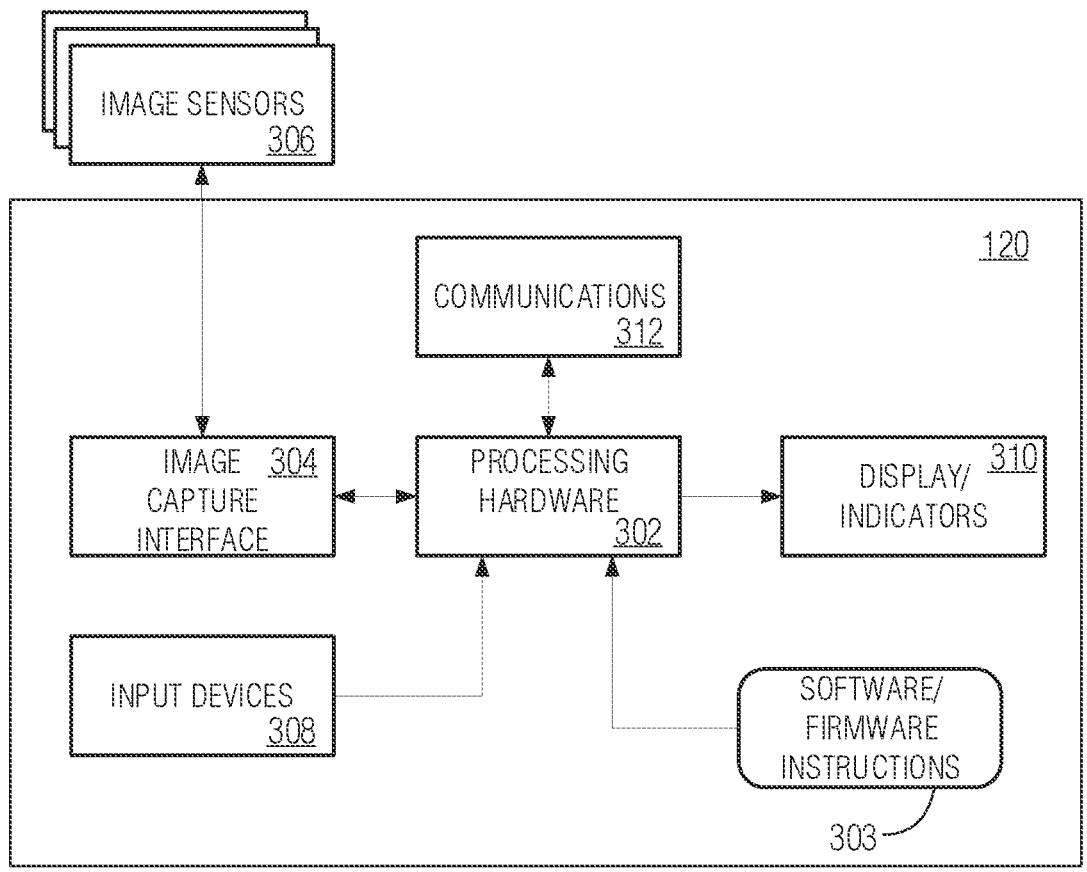
FIG. 3 is a high-level block diagram illustrating an example system architecture of a scanning system, with various components of an image processing system shown.

FIG. 3 is a high-level block diagram illustrating an example system architecture of scanning system 100, with various components of image processing system 120 shown. Image processing system 120 includes processing hardware 302 operatively coupled to image capture interface 304, input devices 308, display or indicators 310, and communications circuitry 312. Processing hardware 302 includes one or more processor circuits that execute software or firmware instructions 303, with the latter being stored in a non-transitory machine-readable medium such as a read-only memory, flash memory, random-access memory, or the like.

Image processing system 120 includes various engines, each of which is configured to carry out a function or set of functions, as detailed below. The term "engine" as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is specifically configured (e.g., hardwired), or temporarily configured (e.g., programmed) to operate in a specified manner or to perform part or all of any operations described herein in connection with that engine.

In examples in which engines are temporarily configured, each of the engines may be instantiated at different moments in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Image capture interface 304 includes one or more engines facilitating the exchange of data between processing hardware 302 and image sensors 306. In some examples, image capture interface 304 includes data buffers, video decoders, video encoders, address and data bus interfaces, serial data receiver/transmitter circuitry, analog-to-digital (A/D) converter circuitry, and the like. The data communications portions of image capture interface 304 may facilitate wired or wireless communication. Image capture interface 304 is operative to pass video frames from their original format as output by each of image sensors 306 to processing hardware 302 in a suitable data format to be read by processing hardware 302.

In a related example, image capture interface 304 may additionally be configured to pass information from processing hardware 302 to one or more of image sensors 306. This upstream information may include configuration commands such as sensor gain settings, frame rate, exposure control, activation/deactivation commands, etc.

Notably, in some embodiments, image capture interface 304 may be integrated as part of a digital signal processor (DSP) device or microcontroller device. In other embodiments, image capture interface 304 may be integrated as part of one or more image sensors 306.

Input devices 308 include user-operable controls, such as pushbuttons, keypad, touchscreen, and the like, as well as additional sensors, such as a ranging sensor, motion sensor, etc. Display or indicators 310 include devices such as a liquid-crystal display (LCD), LED indicators, speaker or buzzer, and other suitable output devices.

Communications circuitry 312 includes wired or wireless communications facilities that provide input and output to and from processing hardware 302. Communication circuitry may include one or more of the following types of communication circuits: universal serial bus (USB), CAN, $I^2C$, Ethernet, personal-area network such as Bluetooth according to an IEEE 802.15 standard, Wi-Fi according to an IEEE 802.11 standard, or the like.

FIGS. 4A-4D are simplified schematic diagrams that illustrate various optical and image-sensor combinations that may be employed as examples of one or more image-capture devices such as image-capture devices 102. FIG. 4A illustrates an example where a single objective 406 is arranged to work with multiple image sensors 306A and 306B. These components are housed in a single enclosure 402.

FIG. 4B illustrates an example with separate objectives 406A and 406B corresponding to image sensors 306A and 306B, respectively. These components are housed in a single enclosure 402 as depicted. FIG. 4C illustrates an example with separate enclosures, 402A and 402B, each having a corresponding image sensor 306A, 306B and objective 406A, 406B.

FIG. 4D illustrates an example arrangement consistent with handheld reader 200 described above with reference to FIG. 2. A single enclosure 402 houses image sensors 306A and 306B, each arranged with a corresponding objective 406A and 406B. Laser emitter 210 is also shown. As described above, laser emitter 210 may be used to place a spot on a surface containing subject 412, and video frames captured by image sensors 306A and 306B may be evaluated to determine the ranging to subject 412.

Figure 5:
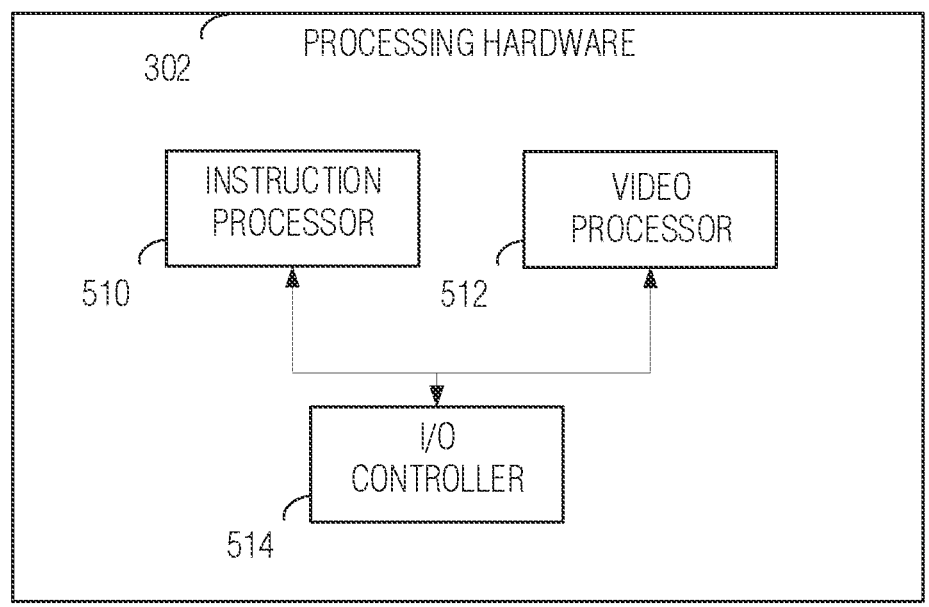
FIG. 5 is a simplified block diagram illustrating a portion of processing hardware of an image processing system according to one example.

FIG. 5 is a simplified block diagram illustrating a portion of processing hardware 302 of image processing system 120 according to one example. Processing hardware 302 includes instruction processor 510, video processor 512, and input/output (I/O) controller 514. Instruction processor 510 is constructed to execute software or firmware instructions 303, the execution of which causes instruction processor 510 to implement engines to carry out the overall functionality of scanning system 100. For instance, instruction processor 510 reads input devices 308 and takes actions in response to those inputs; instruction processor 510 writes output to display or indicators 310; and instruction processor 510 exchanges data with communications circuitry 312 to send and receive data to or from other devices. In addition, instructions 303, when executed by instruction processor 510, causes instruction processor 510 to carry out scanning optimization operations, including assessing the prevailing conditions associated with the subject, the environment, and usage of scanning system 100 and, in response to those conditions, determining and setting the one or more operational parameters for capturing images.

Instruction processor 510 may be of any suitable architecture. As an example, instruction processor 510 may include a central processing unit (CPU) core, RAM, non-volatile memory, memory controllers, address and data (or shared) busses, serial communications ports such a universal synchronous receiver/transmitter (UART), and peripheral circuitry such as timers, event counters, A/D or D/A converters, pulse-width modulation (PWM) generator, etc.

Video processor 512 is interfaced with instruction processor 510, and implements engines to receive captured images from image-capture devices 102, and to resample, crop, compress, or combine portions of images, filter, evaluate visual characteristics of the captured images, and perform symbol reading or object detection algorithms. In some embodiments, video processor 512 includes a digital signal processor (DSP) core having a computing architecture that is optimized for video processing and including additional or specialized arithmetic logic units (ALUs), direct-memory access, fixed-point arithmetic, etc.

I/O controller 514 includes circuitry that facilitates addressing, data transfer, memory access, and other interactions between instruction processor 510, video processor 512, and the other components of image processing system 120. As examples, I/O controller 514 may include a bus or system interconnect controller, a serial communications hub controller, or the like.

In related embodiments, instruction processor 510 and video processor 512 are integrated as a single processing device, such as a digital signal controller (DSC) that is configured to perform the respective functionality of instruction processor 510 and video processor 512 described above. Similarly, I/O controller 514 may also be integrated as part of a DSC implementation.

Figure 6:
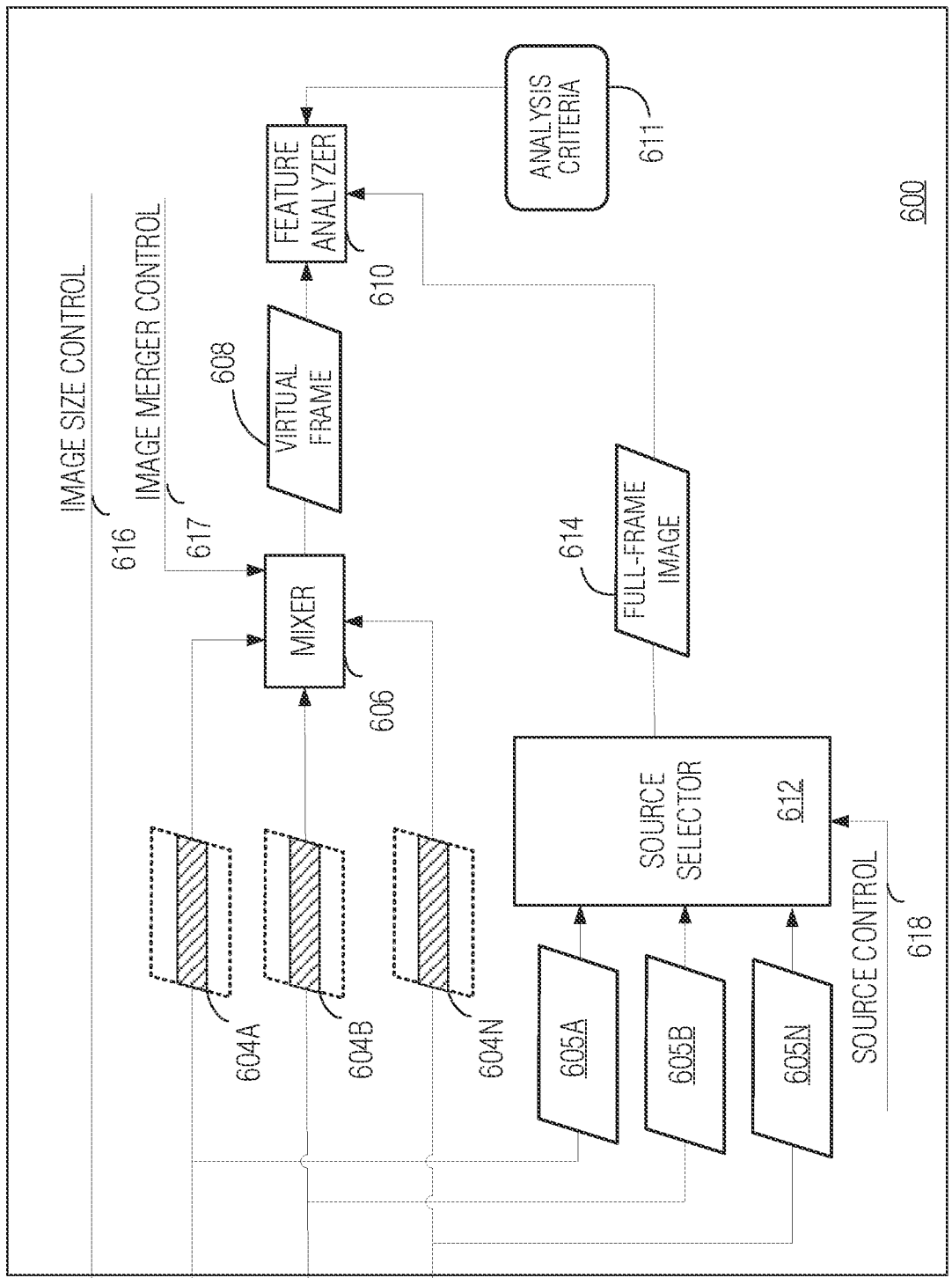
FIG. 6 is a simplified block diagram illustrating a measurement engine for implementing part of a multi-phase algorithm for determining operational parameters for capturing images according to some embodiments.

FIG. 6 is a simplified block diagram illustrating a measurement engine 600 for implementing part of a multi-phase algorithm for determining operational parameters for capturing images according to some embodiments. Measurement engine 600 may be implemented using video processor 512 according to some embodiments. Measurement engine 600 as depicted includes mixer 606, feature analyzer 610, and source selector 612.

Mixer 606 receives, as its input, reduced-data image frames 604A, 604B, 604N, from corresponding image-capture devices 102A, 102B, 102N. The reduced-data image frames 604A, 604B, 604N may be captured using a selected subset of the full-frame image sensor of each respective image-capture device 102, or they may be computed from the full-frame captured image to produce a reduced-data version. As an example of the former case, an image size control signal 616 may be provided to each image-capture device 102A, 102B, 102N to indicate or represent a specific subset of rows or columns of the image sensor array to be used in capturing an image. In the latter case, a size-reduction operation may be performed on the captured full-frame image, such as subset selection, subsampling, binning, or other operation, described in greater detail below. The size-reduction operation may be performed at the data-capture device, by image-capture interface 304 (FIG. 3), or elsewhere (e.g., by processing hardware 302 such as video processor 512). For the sake of brevity, the captured, extracted, or otherwise computed size-reduced image, will be referred to as simply, the reduced-data image frame.

The reduced-data image frame 604A, 604B, 604N is fed to video mixer 606, which merges together the reduced-data image frames to produce virtual frame 608. In turn, virtual frame 608 is read and processed by feature analyzer 610, which is configured to determine or assess one or more attributes of virtual frame 608 based on analysis criteria 611.

Notably, measurement engine 600 establishes a single video channel at the output of mixer 606 in which information from a plurality of image sensors can be analyzed together as a single virtual frame 608. In related embodiments, virtual frame 608 is smaller (i.e., has fewer pixels) than the sum of the full-frame images otherwise available from the image-capture devices 604A, 604B, 604N. In one such example, a related type of embodiment, virtual frame is smaller than a single full-frame image.

In a related embodiment, reduced-data image frames 604A, 604B, 604N can arrive simultaneously to video mixer 606 (i.e. the corresponding image capture devices 102A, 102B, 102N are triggered to produce frames at the same time). Mixer 606 then creates virtual frame 608 as a stream, which in this example is composed by the real-time fusion of portions of the synchronous streams 604A, 604B, 604N.

In another embodiment, virtual frame 608 is composed by interleaving lines from the reduced-data image frames. This implementation does not require any buffer memory inside the mixer 606.

The one or more attributes on which analysis criteria 611 is based may include features of the subject, lighting/exposure level, contrast, reflections, bright spots, shadows, laser spot location, focus quality index (e.g., Laplacian energy), and the like. In some embodiments, feature analyzer 610 may be implemented using a DSP core of video processor 512 or other type of specialized image processing circuitry. In other embodiments, a CPU core may be used to implement feature analyzer 610.

In a related embodiment, the selection or generation of the reduced-data image frames 604A, 604B, 604N is adjustable. For example, the size of, or location within, the frame of a selected image portion to be extracted as part of a partial-frame extraction technique may be varied. In the example depicted, image size control 616 may be provided to image capture devices 102A, 102B, 102N. In a related embodiment, the technique of merging the reduced-data image frames is itself adjustable. For instance, as shown, image merger control signal 617 may be provided to mixer 606 to select, adjust, or otherwise indicate, a specific image-merging operation. To accommodate operational-parameter adjustment, control signaling 616 and 617 may be provided from instruction processor 510, for instance.

Source selector 612 is a multiplexer that selects a full-frame image 605A, 605B, 605N, respectively, from among the outputs of image-capture devices 102A, 102B, 102N, to output selected full-frame image 614. The source-control signaling 618 for selection of the full-frame image 614 may be supplied from instruction processor 510, for instance.

Figure 7:
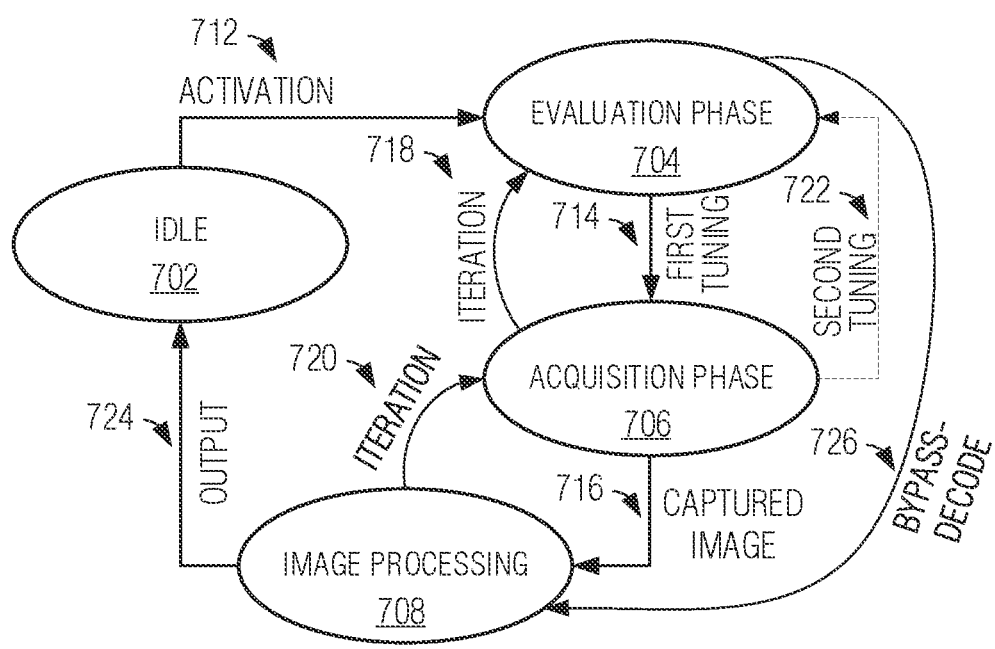
FIG. 7 is a state diagram illustrating a multi-phase operational regime of an image processing system according to an example embodiment.

FIG. 7 is a state diagram illustrating a multi-phase operational regime of image processing system 120 according to an example embodiment. The states include idle 702, evaluation phase 704, acquisition phase 706, and image processing 708. Evaluation phase 704 is started in response to an activation event 712. In the example of a hand-triggered reader such as handheld reader 200, the activation event may be actuation of a pushbutton.

Evaluation phase 704 involves performing a rapid assessment, using feature analyzer 610 and analysis criteria 611, of some attributes of virtual frame 608 that are indicative of the quality of different portions of virtual frame 608 corresponding to data captured by different ones of the image-capture devices 102, or that are indicative of the physical or optical configurations of the respective image-capture devices 102. In the present context, a rapid assessment is an image processing-based evaluation using a single virtual frame rather than one or more full-frame images.

As a result of the rapid assessment of the virtual frame 608 in the evaluation phase, operational parameters for the acquisition phase 706 are determined and set as part of first tuning 714. These operational parameters define a configuration of one or more image-capture devices 102, lighting control, or the like. According to some examples, the operational parameters that may be determined and set include selection of one of the image sensors which is deemed optimal, exposure setting for the image capture, gain control for the image sensor, focal length to the subject, focal depth, illumination settings, selection of a region of interest (ROI), or any combination of these and other available settings.

Acquisition phase 706 includes execution of an image-capture process using the determined operational parameters from the evaluation phase based on first tuning 714. For example, the best image sensor may be selected, along with various settings for that image sensor, such as gain, exposure, etc. In related embodiments, where different image sensors are located in cameras having different types of optical systems, the selection of an image sensor may be based on selection of the corresponding optical system. In further examples, where a camera's optical system is variable according to configuration settings (e.g., variable focus objective), selection of the image sensor/camera may include setting the variable optical system to a desired focus configuration. In addition, if a flash or other lighting control is available, its use may likewise be selected and adapted based on first tuning 714. Acquisition phase 706 produces as its output a captured full-frame image at 716. In addition, acquisition phase 706 may further include operations on the captured full-frame image to assess one or more attributes of the captured image that are indicative of the quality of the image capture using feature analyzer 610 and analysis criteria 611. This operation is similar to the rapid assessment of evaluation phase 704, except that the full-frame image, rather than the virtual frame, is the subject of the assessment.

Acquisition phase 706 may transition to evaluation phase 704 for one or multiple iterations, as indicated at 718. In some embodiments, multiple iterations are executed for each activation 712. These iterations may be repeated according to a set time interval. In another example, the iterations are performed based on need. For instance, if acquisition phase 706 captures an image of insufficient quality (e.g., as determined according to predefined criteria defining one or more quality measures in term of image attributes), iteration 718 may be called for to further optimize the operational parameters of the acquisition phase by performing evaluation phase 704 and first tuning operation 714.

In related embodiments, operational parameters for evaluation phase 704 are adjusted as part of second tuning operation 722. Second tuning operation 722 may be called in response to evaluation of a captured full-frame image at acquisition phase 706, for instance. As part of second tuning 722, the type of technique for generating the reduced-data image frame may be varied. Similarly, the size of, or location within, the frame of a selected image portion to be extracted as part of a partial-frame extraction technique may be varied.

Image processing operations 708 are generally performed on captured full-frame image 716 resulting from operation of acquisition phase 706. Captured full-frame image 716 includes at least one subject. Image processing operations 708 include reading of the subject (e.g., reading, text recognition, object detection, object recognition, etc.). Image processing 708 is a more computationally-expensive process than the attribute assessment operations that are performed as part of evaluation phase 704 or acquisition phase 706. The result of image processing 708 is output 724, which may be in the form of a data object indicating the data of a, recognized text or object, etc.

In some embodiments, as part of image processing 708, a determination may be made regarding the quality of the image of the subject. In one embodiment, an assessment may be made as part of image processing 708 regarding the sufficiency of the image. For example, if image processing 708 determines that a is not readable, iteration 720 may be called for to transition to acquisition phase 706 for re-capture of a fresh image or further tuning of the operational parameters via first tuning 714.

In some related embodiments, evaluation phase 704 may transition directly to image processing 708, as indicated by bypass-decode transition 726, which bypasses acquisition phase 706 and one or both tuning operations 714, 722. This bypass-decode transition may be executed, for instance, when the virtual frame 608 appears to contain sufficient quality image data to be used for the image processing operations at 708. Bypass-decode transition 726 is supported by rapid assessment operations as part of evaluation phase 704 that can detect a presence of a machine-readable symbol.

Figure 8:
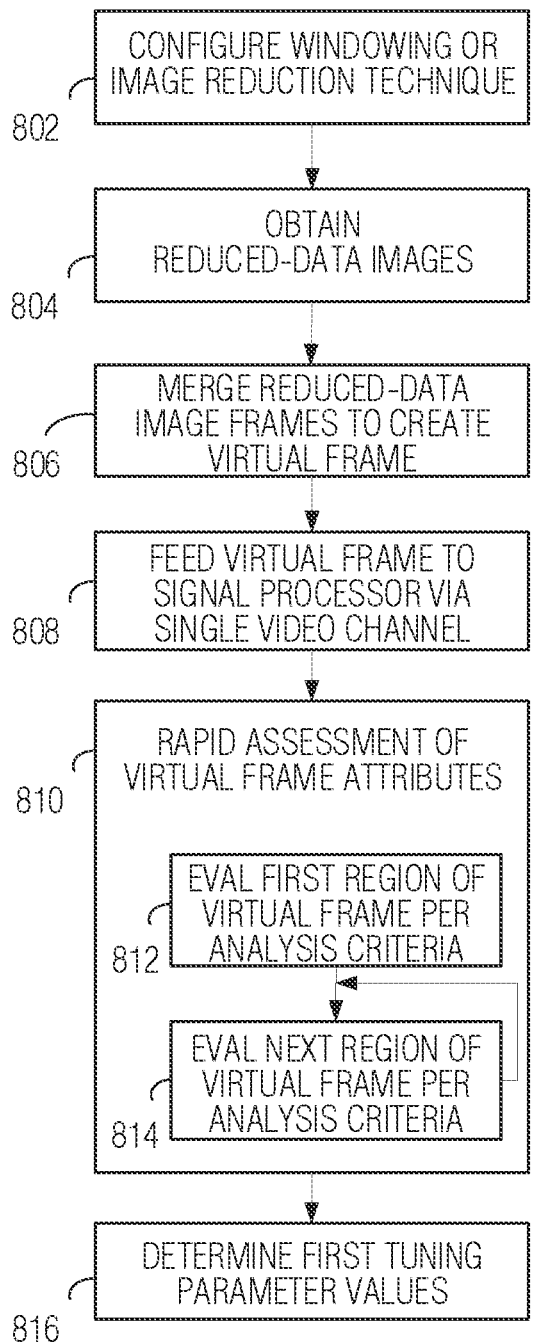
FIG. 8 is a process flow diagram illustrating an example sequence of operations corresponding to an evaluation phase of the multi-phase operational regime of the example of FIG. 7.

FIG. 8 is a process flow diagram illustrating an example sequence of operations corresponding to evaluation phase 704. These operations may be performed with different orderings of operations unless certain operations are specifically called out as being performed in sequence. In some variations, certain operations may be modified or omitted.

At 802, operational parameters for windowing or image data reduction are configured. Various examples of such techniques are discussed in greater detail below with reference to FIG. 11. At 804, reduced-data images are obtained from different data-capture devices. As pointed out above, various methods of achieving the data-reduced image frames include configuring the image-capture devices 102 (e.g., windowing) to capture partial-frame images at the outset, or capturing full-frame images, and processing the same to produce the reduced-data images. In the latter type of embodiment, data reduction, such as cropping, resampling, binning, or the like, is applied to produce reduced-data image frames corresponding to respective ones of the initially-captured full-frame images. The reduced-data image frames may be produced by a different ones, or combinations of techniques, and different techniques can be used for different ones of the image-capture devices 102 according to some examples.

At 806, the reduced-data images are merged together to produce a virtual frame such as virtual frame 608. The virtual frame may be represented as a single bitmap image, for example. Other image formats may be suitably used to represent the virtual frame. As discussed above, the virtual frame may have fewer pixels than the sum of the pixels of the full-frame images and, in some embodiments, the virtual frame may have fewer pixels than any one of the full-frame images. The full-frame images may be discarded to free up memory resources.

In another embodiment, the reduced data images are real-time video streams of data coming from the image capture devices triggered to produce frames synchronized in time. Those frames are composed into the virtual frame as a stream of video data feeding the signal processor that performs the assessment of virtual frame attributes in real time.

At 808, the virtual frame is fed, via a single video channel, to a signal processor such as a processor that implements feature analyzer 610. At 810, the signal processor performs rapid assessment of attributes of the virtual frame. As depicted at 812-814, operation 810 includes a region-by-region evaluation of the virtual frame, where each region corresponds to a particular image-capture device. Accordingly, at 812, the first region of the virtual frame is tested and, at 814, the next region is tested. The process repeats for any additional regions of the virtual frame. The result of operation 810 is a data set representing a set of attribute assessments for each of the regions of the virtual frame. At 816, the first tuning parameter values are determined as discussed above, based on the rapid assessment.

Figure 9:
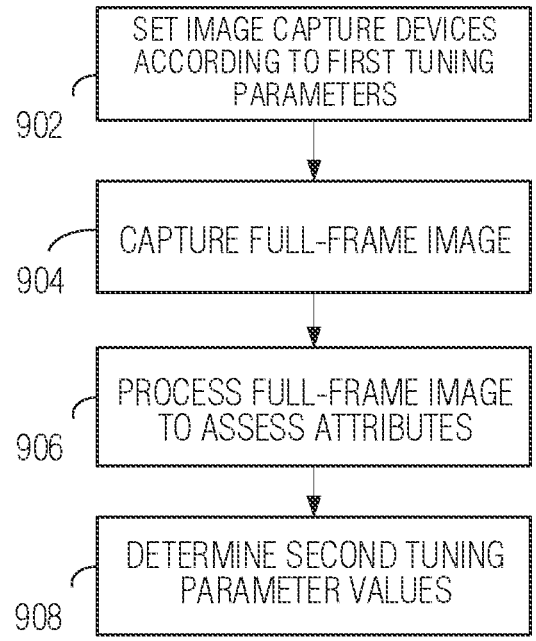
FIG. 9 is a process flow diagram illustrating an example sequence of operations corresponding to an acquisition phase of the multi-phase operational regime of the example of FIG. 7.

FIG. 9 is a process flow diagram illustrating an example sequence of operations corresponding to acquisition phase 706. These operations may be performed with different orderings of operations unless certain operations are specifically called out as being performed in sequence. In some variations, certain operations may be modified or omitted.

At 902, the image-capture devices 102 and related peripherals, such as lighting devices, are set according to the first tuning parameters as determined at operation 810. The first tuning parameters may include selection of a particular image-capture device, determination of prioritization of image-capture devices for subsequent information processing, focal length setting based on a determined ranging to the subject from the virtual frame or a separate sensor, focal length setting based on contrast estimation of regions in the virtual frame, automatic exposure and gain control settings one or more of the image-capture devices based on information of the portion of virtual frame corresponding to the respective image-capture devices, illumination power setting of a lighting device, or any combination thereof.

At 904, a full-frame image is captured using the first tuning parameters. At 906, the captured full-frame image is processed to assess attributes indicative of the quality of the image of the subject. At 908, the assessed attributes of the full-frame image are analyzed to determine the second tuning parameter values as discussed above.

Figure 10A:
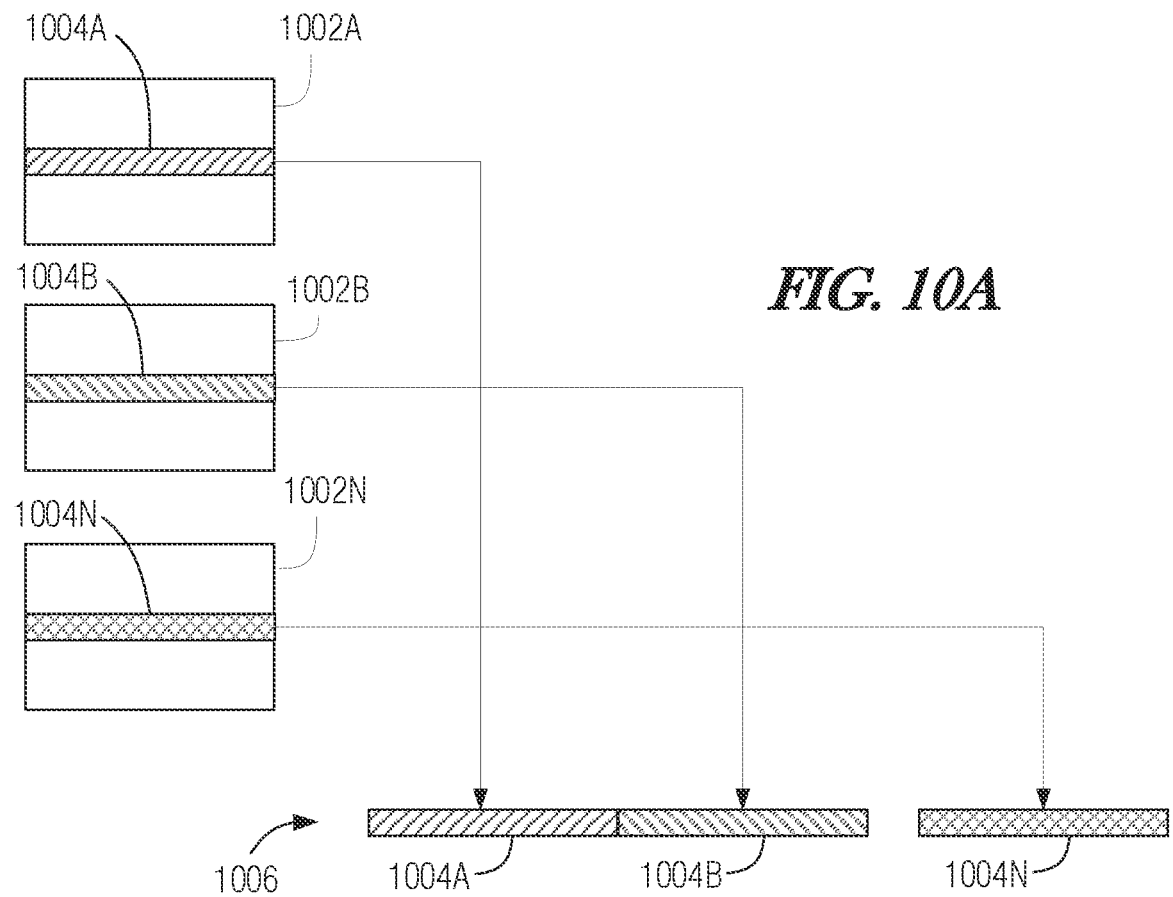
FIGS. 10A and 10B are diagrams illustrating example algorithms for constructing a virtual frame.
Figure 10B:
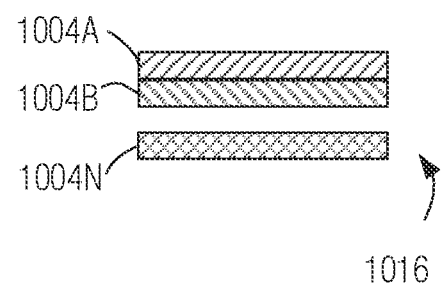

FIGS. 10A and 10B are diagrams illustrating example algorithms for constructing a virtual frame. As depicted in FIG. 10A, initially-captured full-frame images 1002A, 1002B, and 1002N are subjected to windowing operations as discussed above to produce respective reduced-data image frames 1004A, 1004B, and 1004N. In this illustrative example, each reduced-data image frame 1004 consists of a strip having the width of the full-frame image, and a height which is a small fraction of the full-frame image. Each strip in this example is selected to include the center of the image frame.

The reduced-data image frames 1004A, 1004B, and 1004N are merged together horizontally as shown to form virtual frame 1006. Virtual frame 1006 has a width (as measured in pixels) equal to the sum of the widths of reduced-data image frames 1004A, 1004B, and 1004N, and a height equal to the height of one of the reduced-data image frames 1004A, 1004B, and 1004N.

FIG. 10B illustrates an example of virtual frame 1016 in which reduced-data image frames 1004A, 1004B, and 1004N are merged together vertically as shown. Virtual frame 1016 has a width equal to the width of one of the reduced-data image frames 1004A, 1004B, and 1004N, and a height equal to the sum of the heights of reduced-data image frames 1004A, 1004B, and 1004N.

Figure 11A:
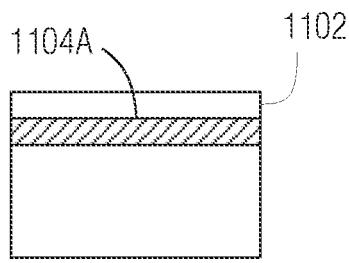
FIGS. 11A-11E illustrate various data-reduction techniques for producing reduced-data image frames from full-frame images according to various related embodiments.
Figure 11B:
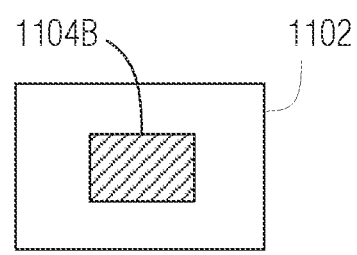
Figure 11C:
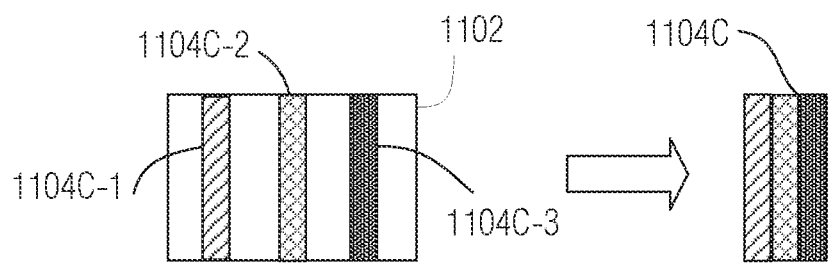

Notably, the virtual frame comprises regions based on data captured by different image-capture devices, depending on the windowing technique used for producing the reduced-data image frames. FIGS. 11A-11E illustrate various data-reduction techniques for producing reduced-data image frames 1104 from full-frame image 1102 according to various related embodiments. FIG. 11A shows an example in which reduced-data image frame 1104A is a horizontal strip similar to reduced-data image frame 1004A, except that reduced-data image frame 1104A is vertically offset from the center of full-frame image 1102. FIG. 11B shows reduced-data image frame 1104B as a horizontally and vertically cropped portion of full-frame image 1102. FIG. 11C shows an example where reduced-data image frame 1104C is composed of non-contiguous sub-portions 1104C-1, 1104C-2, and 1104C-3 which are vertical strips.

Figure 11D:
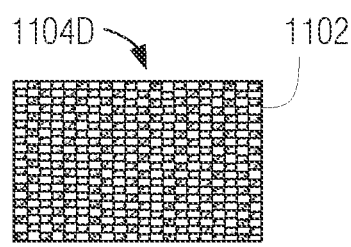

FIG. 11D illustrates an example in which reduced-data image frame 1104D is produced by subsampling full-frame image 1102. The subsampling may be achieved, for instance, by sampling every $m^{th}$ pixel and omitting the rest.

Figure 11E:
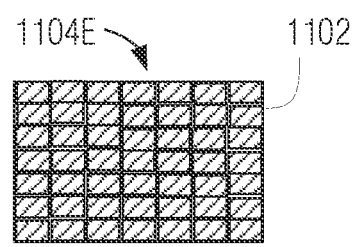

FIG. 11E illustrates an example in which reduced-data image frame 1104E is produced by binning of blocks of adjacent pixels and replacing each block with a single pixel having a value based on the individual pixels making up that block. For example, each block may be replaced by a pixel value equal to the computed average of the block.

Figure 12:
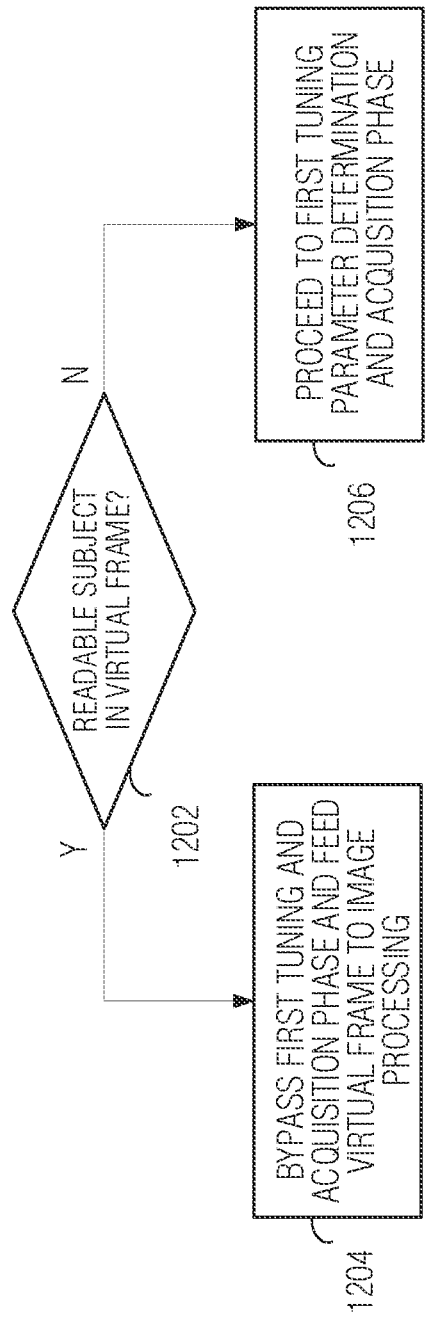
FIG. 12 is a process flow diagram illustrating a variation of certain operations of the process depicted in FIG. 8 according to some embodiments.

FIG. 12 is a process flow diagram illustrating a variation of operations 810-816 of FIG. 8 corresponding to evaluation phase 704, according to some embodiments. At 1202, as part of the rapid assessment of attributes of the virtual frame, a determination is made whether there is a readable subject present in at least one region of the virtual frame. In the affirmative case, at 1204, first tuning operation 714 and acquisition phase 706 are bypassed, and the virtual frame is passed to image processing 708 in lieu of any subsequently-captured full-frame image. This option provides a performance improvement by eliminating any latency and energy utilization associated with the bypassed operations. If decision 1202 determines that no readable subject is present in the virtual frame, the process advances to 1206, which calls for performing the first tuning operation 714 and the acquisition phase 706 as described above.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalents.

ADDITIONAL NOTES AND EXAMPLES

Example 1 is an apparatus of an optical scanner for scanning a subject, the apparatus comprising: an interface circuit including an input to receive a plurality of images from a plurality of image-capture devices; an input to receive an activation signal; circuitry coupled to the interface circuit and the input, the circuitry operative to execute an evaluation phase in response to the activation signal, and an acquisition phase in response to the evaluation phase, wherein: in the evaluation phase, a first set of images is captured via the plurality of image-capture devices and processed to produce a virtual frame comprising a plurality of regions, each region containing a reduced-data image frame that is based on a corresponding one of the plurality of images; in the evaluation phase, attributes of each of the plurality regions of the virtual frame are assessed according to first predefined criteria, and operational parameters for the acquisition phase are set based on a result of the assessment; and in the acquisition phase, a second set of at least one image is captured via at least one of the plurality of image-capture devices according to the set of operational parameters.

In Example 2, the subject matter of Example 1 includes, wherein the plurality of image-capture devices includes at least three image-capture devices.

In Example 3, the subject matter of Examples 1-2 includes, wherein the plurality of image-capture devices include different types of image sensors.

In Example 4, the subject matter of Examples 1-3 includes, wherein in the evaluation phase, the first set of images are captured simultaneously by the plurality of image-capture devices.

In Example 5, the subject matter of Examples 1-4 includes, wherein the different ones of the plurality of image-capture devices include different types of optical systems.

In Example 6, the subject matter of Examples 1-5 includes, wherein the processing hardware is further constructed and programmed to execute an image processing operation in response to the capture of the second set of at least one image.

In Example 7, the subject matter of Example 6 includes, wherein the image processing operation comprises at least one operation selected from the group consisting of: barcode reading, optical character recognition, object detection, object recognition, pattern recognition, or any combination thereof.

In Example 8, the subject matter of Examples 1-7 includes, wherein the attributes of each of the plurality regions of the virtual frame are assessed using a single video channel.

In Example 9, the subject matter of Examples 1-8 includes, wherein the first predefined criteria includes at least one criterion selected from the group consisting of: features of the subject, lighting level, exposure level, contrast, reflections, bright spots, shadows, laser spot location, focus quality index, or any combination thereof.

In Example 10, the subject matter of Examples 1-9 includes, wherein the attributes of each of the plurality of regions of the virtual frame are indicative of physical or optical configurations of the image-capture device that captured the respective image corresponding to that region of the virtual frame.

In Example 11, the subject matter of Examples 1-10 includes, wherein the operational parameters for the acquisition phase include at least one parameter selected from the group consisting of: preferential selection of an image-capture device, exposure duration setting for the image-capture device, gain setting for the image-capture device, focal length to the subject, focus configuration, illumination settings, selection of a region of interest (ROI), or any combination thereof.

In Example 12, the subject matter of Examples 1-11 includes, wherein in the evaluation phase, in response to a single activation signal: a plurality of sets of images are captured via the plurality of image-capture devices and processed to produce a plurality of virtual frames; and attributes of each of the plurality regions of each of the plurality of virtual frames are assessed according to the first predefined criteria.

In Example 13, the subject matter of Examples 1-12 includes, wherein in the acquisition phase, attributes of the second set of at least one image are assessed according to second predefined criteria, and operational parameters for the evaluation phase are set based on a result of that assessment.

In Example 14, the subject matter of Examples 1-13 includes, wherein the reduced-data image frame based on a corresponding one of the plurality of images is produced by a cropping operation, a windowing operation, or by a combination thereof, of that corresponding one of the plurality of images.

In Example 15, the subject matter of Examples 1-14 includes, wherein the reduced-data image frame based on a corresponding one of the plurality of images is produced by a subsampling operation, a binning operation, or by a combination thereof, of that corresponding one of the plurality of images.

Example 16 is a method for operating an optical scanner for scanning a subject, the method comprising: capturing a plurality of images from a plurality of image-capture devices in response to an activation signal; autonomously executing an evaluation phase in response to the activation signal; and autonomously executing an acquisition phase in response to the evaluation phase, wherein: in the evaluation phase, a first set of images is captured via the plurality of image-capture devices and processed to produce a virtual frame comprising a plurality of regions, each region containing a reduced-data image frame that is based on a corresponding one of the plurality of images; in the evaluation phase, attributes of each of the plurality regions of the virtual frame are assessed according to first predefined criteria, and operational parameters for the acquisition phase are set based on a result of the assessment; and in the acquisition phase, a second set of at least one image is captured via at least one of the image-capture devices according to the set operational parameters.

In Example 17, the subject matter of Example 16 includes, wherein capturing the plurality of images is performed by at least three image-capture devices.

In Example 18, the subject matter of Examples 16-17 includes, wherein the plurality of image-capture devices include different types of image sensors.

In Example 19, the subject matter of Examples 16-18 includes, wherein in the evaluation phase, the first set of images are captured simultaneously by the plurality of image-capture devices.

In Example 20, the subject matter of Examples 16-19 includes, wherein the plurality of different image-capture devices include different types of optical systems.

In Example 21, the subject matter of Examples 16-20 includes, autonomously executing an image processing operation in response to the capture of the second set of at least one image.

In Example 22, the subject matter of Example 21 includes, wherein the image processing operation comprises at least one operation selected from the group consisting of: barcode reading, optical character recognition, object detection, object recognition, pattern recognition, or any combination thereof.

In Example 23, the subject matter of Examples 16-22 includes, wherein the attributes of each of the plurality regions of the virtual frame are assessed using a single video channel.

In Example 24, the subject matter of Examples 16-23 includes, wherein the first predefined criteria includes at least one criterion selected from the group consisting of: features of the subject, lighting level, exposure level, contrast, reflections, bright spots, shadows, laser spot location, focus quality index, or any combination thereof.

In Example 25, the subject matter of Examples 16-24 includes, wherein the attributes of each of the plurality of regions of the virtual frame are indicative of physical or optical configurations of the image-capture device that captured the respective image corresponding to that region of the virtual frame.

In Example 26, the subject matter of Examples 16-25 includes, wherein the operational parameters for the acquisition phase include at least one parameter selected from the group consisting of: preferential selection of an image-capture device, exposure duration setting for the image-capture device, gain setting for the image-capture device, focal length to the subject, focus configuration, illumination settings, selection of a region of interest (ROI), or any combination thereof.

In Example 27, the subject matter of Examples 16-26 includes, wherein in the evaluation phase, in response to a single activation signal: a plurality of sets of images are captured via the plurality of image-capture devices and processed to produce a plurality of virtual frames; and attributes of each of the plurality regions of each of the plurality of virtual frames are assessed according to the first predefined criteria.

In Example 28, the subject matter of Examples 16-27 includes, wherein in the acquisition phase, attributes of the second set of at least one image are assessed according to second predefined criteria, and operational parameters for the evaluation phase are set based on a result of that assessment.

In Example 29, the subject matter of Examples 16-28 includes, wherein the reduced-data image frame based on a corresponding one of the plurality of images is produced by a cropping operation, a windowing operation, or by a combination thereof, of that corresponding one of the plurality of images.

In Example 30, the subject matter of Examples 16-29 includes, wherein the reduced-data image frame based on a corresponding one of the plurality of images is produced by a subsampling operation, a binning operation, or by a combination thereof, of that corresponding one of the plurality of images.

Example 31 is at least one machine-readable medium including instructions that, when executed by processing circuitry, cause the processing circuitry to perform operations to implement of any of Examples 1-30.

Example 32 is an apparatus comprising means to implement of any of Examples 1-30.

Example 33 is a system to implement of any of Examples 1-30.

Example 34 is a method to implement of any of Examples 1-30.

Example 29 is at least one machine-readable medium including instructions that, when executed by processing circuitry, cause the processing circuitry to perform operations to implement of any of Examples 15-28.

Example 30 is an apparatus comprising means to implement of any of Examples 15-28.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A data reader, comprising:
   a first imager and a second imager configured to capture images of a scene; and
   an image processing system communicatively coupled to each of the first imager and the second imager, to receive image data from each of the first imager and the second imager, wherein the image processing system is configured to:
   produce a virtual frame comprising a plurality of regions, each region containing a reduced-data image frame that is based on a corresponding one of the images captured by the first imager or the second imager;
   assess attributes of each of the plurality regions of the virtual frame according to first predefined criteria; and
   set operational parameters for a subsequent acquisition phase of at least one of the first imager or the second imager based on a result of the assessment,
   wherein, at least one of the first imager or the second imager is configured to capture additional images during the subsequent acquisition phase according to the set operational parameters.

2. The data reader of claim 1, wherein the reduced-data image frames are captured using a selected subset of a corresponding full frame from each of the first imager and the second imager.

3. The data reader of claim 2, wherein the selected subset includes a specific subset of rows or columns of an image sensor array of the corresponding first imager or the second imager.

4. The data reader of claim 1, wherein the reduced-data image frames are generated from a size-reduction operation of full frame images captured by each of the first imager and the second imager.

5. The data reader of claim 4, wherein the size reduction operation is selected from the group consisting of subset selection, subsampling, and binning operations.

6. The data reader of claim 4, wherein the size reduction operation is performed by at least one of the first imager, the second imager, or the image processing system.

7. The data reader of claim 4, wherein the image processing system includes:
   a mixer configured to merge the reduced-data frames to produce the virtual frame; and
   a feature analyzer configured to assess the attributes of each of the plurality regions of the virtual frame according to first predefined criteria.

8. The data reader of claim 7, wherein the reduce-data image frames are fed to the mixer substantially simultaneously.

9. The data reader of claim 7, wherein the mixer merges intervening lines from the reduce-data image frames when producing the virtual frame.

10. The data reader of claim 1, wherein the virtual frame has fewer pixels than a single full frame image available from either the first imager or the second imager.

11. The data reader of claim 1, wherein operational parameters include one or more of selection of image sensor for subsequent information processing, focus settings, illumination power, sensor gain, exposure control, frame rate, or any combination thereof.

12. The data reader of claim 1, wherein the image processing system is configured to:
   assess attributes of each of the plurality regions of the virtual frame according to second predefined criteria;
   set operational parameters for a subsequent acquisition phase of at least one of the first imager or the second imager based on a result of the assessment.

13. The data reader of claim 2, further comprising one or more additional imagers, wherein the virtual frame comprises additional regions of reduce-data image frames based on images captured by the one or more additional imagers.

14. The data reader of claim 1, wherein the data reader is a handheld reader, wherein the first imager and the second imager are forward facing cameras having at least partially overlapping fields of view.

15. The data reader of claim 1, wherein each of the first imager and the second imager is selected from the group consisting of a CMOS-based sensor, CCD-based sensor, visible spectrum sensor, IR sensor, near-IR sensor, high-dynamic-range (HDR) sensor, monochrome sensor, and color sensor.

16. The data reader of claim 1, wherein the first imager and the second imager are housed in a single enclosure.

17. The data reader of claim 1, wherein the first imager and the second imager are house in separate enclosures.

18. A method of operating a data reader having at least a first imager and a second imager operatively coupled to an image processing system, the method comprising:
   capturing images of a scene with a first imager and a second imager; and
   producing a virtual frame comprising a plurality of regions, each region containing a reduced-data image frame that is based on a corresponding one of the images captured by the first imager or the second imager;
   assessing attributes of each of the plurality regions of the virtual frame according to first predefined criteria; and
   setting operational parameters for a subsequent acquisition phase of at least one of the first imager and the second imager based on a result of the assessment; and
   capturing additional images during the subsequent acquisition phase with at least one of the first imager or the second imager configured to according to the set operational parameters.

19. The method of claim 18, wherein the steps of capturing images, producing the virtual frame, assessing attributes, and setting operational parameters are repeated according to a set time interval.

20. The method of claim 18, wherein the steps of capturing images, producing the virtual frame, assessing attributes, and setting operational parameters are repeated based on feedback received from an acquisition phase.

* * * * *